United States Patent

Amaya et al.

Patent Number: 5,955,799
Date of Patent: Sep. 21, 1999

[54] LINEAR VIBRATION MOTOR AND METHOD FOR CONTROLLING VIBRATION THEREOF

[75] Inventors: Hidetoshi Amaya; Takio Maekawa; Toyokatsu Okamoto; Yasuo Ibuki, all of Hikone, Japan

[73] Assignee: Matsushita Electric Works, Ltd., Osaka-fu, Japan

[21] Appl. No.: 09/030,233

[22] Filed: Feb. 25, 1998

[30] Foreign Application Priority Data

Feb. 25, 1997 [JP] Japan .................................. 9-041238

[51] Int. Cl.⁶ .................................................. H02K 33/02
[52] U.S. Cl. ............................ 310/36; 15/22.2; 388/937; 388/902; 318/119; 310/50
[58] Field of Search ................................. 310/36, 50, 12; 318/119, 126, 127, 128, 135, 686; 15/22.2; 388/900, 902, 903, 904, 937

[56] References Cited

U.S. PATENT DOCUMENTS

| 4,583,027 | 4/1986 | Parker et al. ............................ 318/128 |
| 5,613,259 | 3/1997 | Craft et al. ............................. 310/50 X |
| 5,632,087 | 5/1997 | Motohashi et al. . |
| 5,736,797 | 4/1998 | Motohashi et al. ....................... 310/36 |

FOREIGN PATENT DOCUMENTS

0 349 077  6/1989  European Pat. Off. .

*Primary Examiner*—Nestor Ramirez
*Assistant Examiner*—Judson H. Jones
*Attorney, Agent, or Firm*—Griffin, Butler, Whisenhunt & Szipl, LLP

[57] ABSTRACT

A linear vibration motor which includes a vibration system, an electromagnetic driver, a detection system, and a control system. The vibration system includes a driven member or reciprocator which is mounted to a magnetic member for reciprocating movement. The amplitude of the reciprocating movement varies as an inverse function of load on the motor. The electromagnetic driver includes a coil and drives the vibration system by applying an electromagnetic force to the magnetic member, the electromagnetic force being produced by a driving current flowing through the coil. The detection system detects at least one characteristic of the vibration system that is related to a characteristic frequency of the vibration system, and produces a feedback signal indicative of a value of the at least one characteristic. The control system is responsive to the feedback signal, during a primary mode of operation, to controllably vary the driving current flowing through the coil in such a manner as to drive the vibration system in resonance with the characteristic frequency, and determines the existence of a condition that renders the detection system non-functional, and drives the vibration system at a prescribed frequency when it is determined that the condition exists, during a back-up mode of operation.

20 Claims, 9 Drawing Sheets

LINEAR VIBRATION MOTOR AND METHOD FOR CONTROLLING VIBRATION THEREOF

BACKGROUND OF THE INVENTION

The present invention relates generally to linear motors, and more particularly, to a linear vibration motor that is suitable for use in an electric shaver, and a method for controlling vibration of the linear vibration motor. This application claims priority under 35 U.S.C. § 119 of Japanese Patent Application No. 09-041238, filed Feb. 25, 1997, the disclosure of which is incorporated herein by reference.

Japanese Unexamined Patent Publication No. 2-52692 discloses a linear motor that is utilized as a source of reciprocating vibration for a reciprocating type electric shaver. This linear vibration motor is a single-phase synchronous motor that includes a reciprocator (or needle) comprised of a rod-like permanent magnet, and a stator having U-shaped iron cores around which coils are wound. A dc voltage having a frequency two times greater than ac frequency is supplied to the coils by a full-wave rectifying circuit to thereby induce reciprocating movement (oscillation) of the reciprocator, and thereby generate vibration.

The electromagnetic force that is required to induce the reciprocating movement of the reciprocator (or needle) is greater than desired. If the reciprocator were supported with a spring to thereby form a spring vibration system (including the reciprocator), and the spring vibration system driven at a frequency equal to a characteristic (resonant) frequency thereof, it would be possible to reduce the amount of energy necessary to drive the spring vibration system. However, the amplitude of the reciprocating vibration could not be kept stable when the spring vibration system is loaded.

As a solution to this problem, there has been proposed a linear motor including a stator comprised of an electromagnet or permanent magnet, a reciprocator comprised of a permanent magnet or electromagnet and supported with a spring, a detection system that detects the displacement, velocity, or acceleration of the reciprocator and produces a feedback signal indicative thereof, and a control system that controls the amount of electric power supplied to a coil of the electromagnet in response to the feedback signal. With this linear motor, even when a characteristic (resonant) frequency of the vibration system varies, e.g., due to changes in load, the control system automatically varies the amount of electric power supplied to the coil of the electromagnet in such a manner as to drive the vibration system at the current resonant frequency (i.e., to drive the vibration system in resonant condition). This is possible because the variation of the resonant frequency is related in a known manner to the displacement, velocity and acceleration of the reciprocator, at least one of which is detected by the detection system.

However, when the vibration system is heavily loaded, with the result that the amplitude of the reciprocating vibration is considerably reduced, the detection system is rendered inoperative, thereby making it impossible to drive the vibration system in resonant condition. In addition, it takes a considerable amount of time for the vibration system to return to resonant condition even after it is unloaded, thereby resulting in a considerable reduction in the efficiency of the linear motor.

Based on the above, it can be appreciated that there presently exists a need in the art for a linear vibration motor which overcomes the above-described drawbacks and shortcomings of the presently available technology. More particularly, there is presently a need for a linear vibration motor which has the capability of appropriately driving the vibration system when the detection system becomes incapable of carrying out its detection function, and the further capability of rapidly returning the vibration system to resonant condition when the detection system becomes capable of carrying out its detection function. The present invention fulfills this need in the art.

SUMMARY OF THE INVENTION

The present invention encompasses a linear vibration motor which includes a vibration system, an electromagnetic driver, a detection system, and a control system. The vibration system includes a driven member which is mounted to a magnetic member for reciprocating movement. The amplitude of the reciprocating movement varies as an inverse function of load on the motor. The electromagnetic driver includes a coil and drives the vibration system by applying an electromagnetic force to the magnetic member, the electromagnetic force being produced by a driving current flowing through the coil. The detection system detects at least one characteristic of the vibration system that is related to a characteristic frequency of the vibration system, and produces a feedback signal indicative of a value of the at least one characteristic. The control system is responsive to the feedback signal, during a primary mode of operation, to controllably vary the driving current flowing through the coil in such a manner as to drive the vibration system in resonance with the characteristic frequency, and determines the existence of a condition that renders the detection system non-functional, and drives the vibration system at a prescribed frequency when it is determined that the condition exists, during a back-up mode of operation.

In a presently preferred embodiment, the at least one characteristic of the vibration system is the displacement, velocity and/or acceleration of the driven member, and the condition is the start-up mode of the motor and/or the amplitude of the reciprocating movement of the driven member falling below a prescribed minimum threshold level. Also, in the presently preferred embodiment, the driven member is a reciprocator assembly, and the vibration system further includes a spring system which supports the driven member. Further, in the presently preferred embodiment, the control system pulse-width modulates the driving current in response to the feedback signal.

The control system can drive the vibration system at a prescribed frequency which is a single, predetermined fixed frequency, or, alternatively, can either controllably vary the prescribed frequency in accordance with variations in the driving current, or successively use a plurality of different frequencies each of which constitutes the prescribed frequency at the time it is produced. In particularly preferred embodiment, the control system includes a portion which determines the instantaneous value of the characteristic frequency of the vibration system and stores the last instantaneous value of the characteristic frequency before the detection system becomes non-functional for use as the prescribed frequency.

The present invention also encompasses, in another of its aspects, a corresponding method of controlling a linear vibration motor of a type which is suitable for use in an electric shaver. Such a linear vibration motor includes a stator comprised of an electromagnet or permanent magnet, a reciprocator comprised of a permanent magnet or electromagnet and supported with a spring, a detection system which detects at least one of displacement, velocity and acceleration of the reciprocator, and a control system which controls a driving current supplied to a coil of the electromagnet in accordance with a feedback output of the detection system to thereby drive a vibration system including the reciprocator and the spring in resonance with a characteristic frequency of the vibration system. The method includes the steps of determining when a condition exists which prevents the detection system from detecting at least one of displacement, velocity and acceleration of the reciprocator, and using the control system to drive the vibration system at a prescribed frequency when it is determined that the condition exists.

BRIEF DESCRIPTION OF THE DRAWINGS

These and various other objects, features, and advantages of the present invention will be clearly understood with reference to the following Detailed Description of the Preferred Embodiments read in conjunction with the accompanying drawings, in which.

DETAILED DESCRIPTION OF THE PREFERRED EMBODIMENTS

Figure 9:
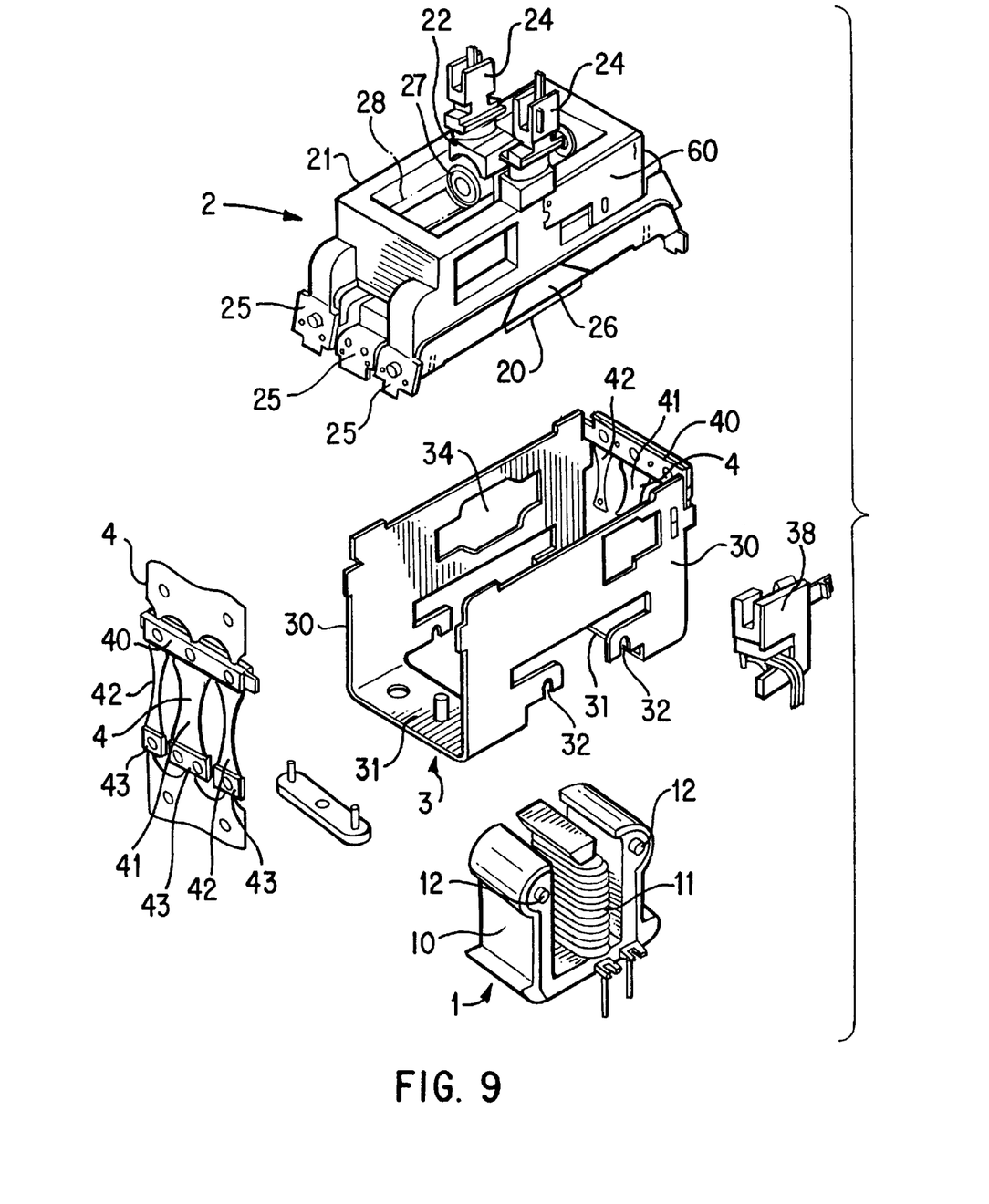
FIG. 9 is an exploded, perspective view of the linear vibration motor of the preferred embodiment of the present invention.
Figure 10:
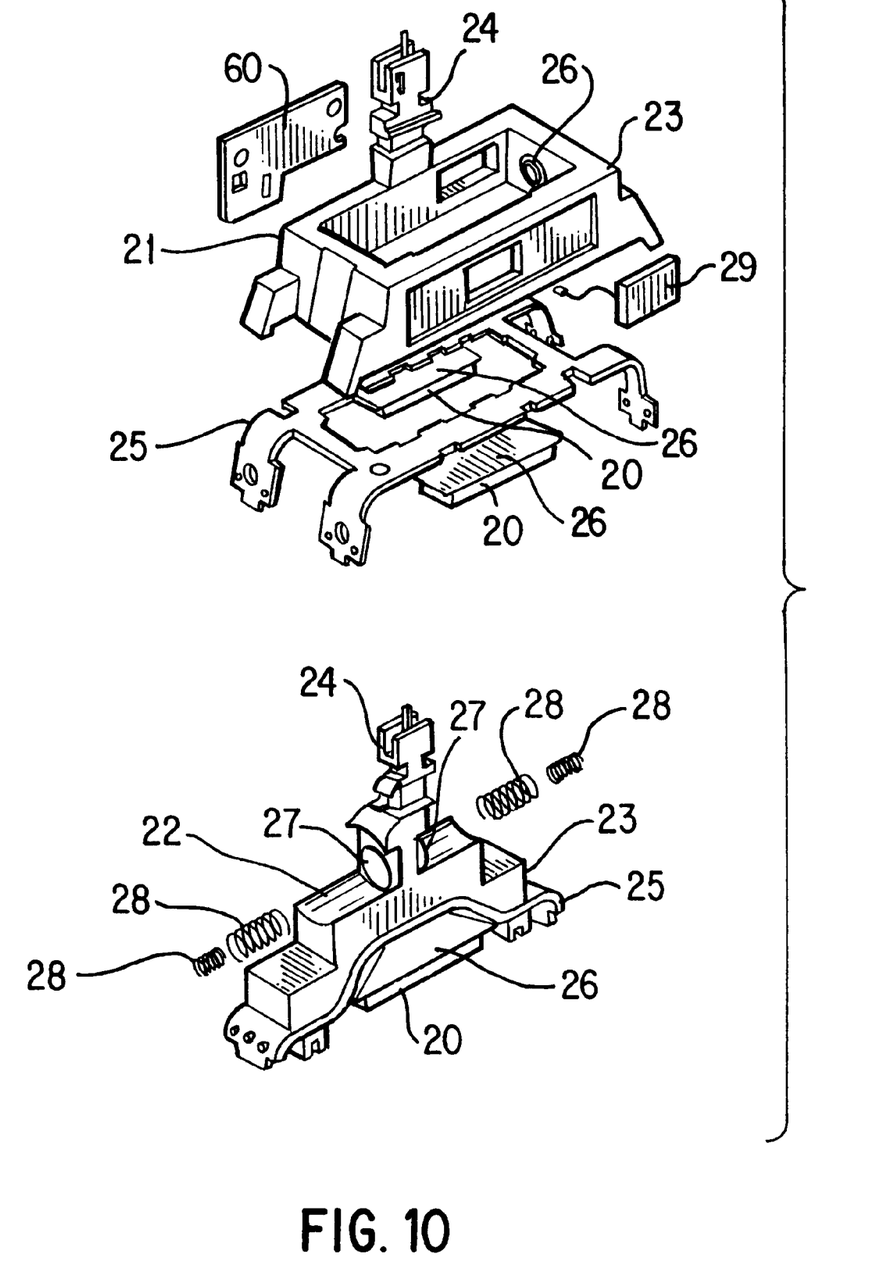
FIG. 10 is an exploded, perspective view of the reciprocator assembly of the linear vibration motor of the preferred embodiment depicted in FIG. 9.

With reference now to FIGS. 9 and 10, there can be seen a linear vibration motor constructed in accordance with a preferred embodiment of the present invention. Although the linear vibration motor of the present invention has particular utility in a reciprocating type electric shaver, it should be clearly understood that the present invention is not limited to this or any other particular application. The linear vibration motor includes a stator 1, a reciprocator assembly 2 (see FIG. 7,) comprised of two reciprocators 21 and 22, and a frame 3.

The stator 1 is comprised of an E-shaped yoke 10 constituted of sintered magnetic material or iron plates, and a coil 11 wound around a central projection of the yoke 10. Pins 12 stand at opposite end surfaces of the yoke 10.

The frame 3 has a pair of sidewalls 30, 30 connected at longitudinal lower ends thereof to each other through bottom plates 31, 31, and hence has a U-shaped cross-section. The pins 12 are fixed into grooves 32 of the sidewalls 30 by welding or caulking to thereby fix the stator 1 to the frame 3.

Each of the reciprocators 21 and 22 includes a driven body 23 composed of synthetic resin, a reinforcing plate 25 and a back yoke 26 both composed of a non-magnetic metal, and a permanent magnet 20 fixed to a lower surface of the driven body 23 through the reinforcing plate 25 and the back yoke 26. The driven body 23 of the reciprocator 21 is a rectangular frame, and includes a reinforcing plate 25, a back yoke 26 and a permanent magnet 20 at lower ends of side walls thereof. The reinforcing plates at the opposite sides of the driven body 23 are integrally formed to thereby form the single reinforcing plate 25. The reinforcing plate 25 is integrally formed with the driven body 23 by insert (or outsert) molding. A coupling 24 that is integrally formed with the driven body 23 is designed to accept internal blades of a reciprocating type electric shaver.

The reciprocators 21 and 22 are connected to the frame 3 through leaf springs 4, 4. The leaf spring 4 is formed by punching a metal plate, and includes a support plate 40 attached to the frame 3, and connecting plates attached to the reciprocators 21 and 22. A central leaf spring 41 connected to the reciprocator 22 and a pair of leaf springs 42, 42 connected to the reciprocator 21 are integral with each other through the support plate 40. By virtue of the support plate 40 being fixed to the opposite ends of the frame 3, e.g., by welding or the like, and further, by virtue of the connecting plates 43 being fixed to the opposite ends of the reinforcing plates 25 of the reciprocators 21 and 22, the reciprocators 21 and 22 are suspended from the frame 3, and the coupling 24 of the reciprocator 22 is located in the reciprocator 21. A pair of compression coil springs 28, 28 are supported in a direction of reciprocating movement of the reciprocators 21 and 22 between spring receivers 26, 26 formed at an inner surface of the reciprocator 21 and spring receivers 27, 27 formed at the coupling 24 of the reciprocator 22.

Figure 7:
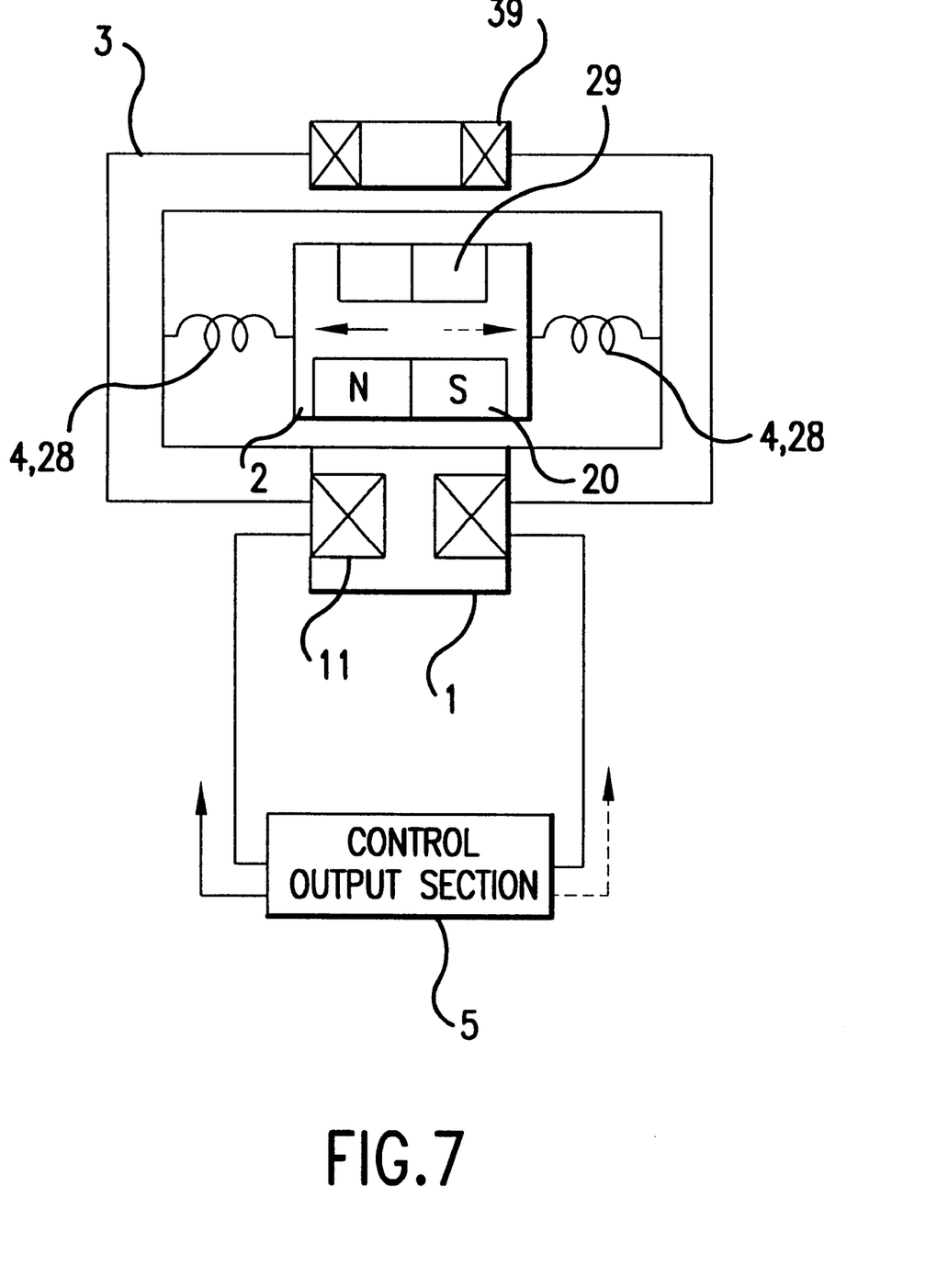
FIG. 7 is a partial block, partial schematic diagram of a linear vibration motor constructed in accordance with a preferred embodiment of the present invention.

The permanent magnet 20 attached to the reciprocator assembly 2 vertically faces the stator 1 with a predetermined gap therebetween, and is magnetized in a direction of the reciprocating movement (oscillation) of the reciprocator assembly 2. As illustrated in FIG. 7, the permanent magnet 20 moves to the right or left in accordance with the direction in which current flows through the coil 11 of the stator 1, with the leaf springs 4 being deformed. Reciprocating movement and vibration of the reciprocator assembly 2 is effected by switching the direction in which the current flows through the coil 11 at the characteristic (resonant) frequency of the vibration system which includes the reciprocator assembly 2, the leaf springs 4, and the compression coil springs 28 (a spring constant component caused by magnetic attractive force is further added to the system, to be precise).

Since the magnetic poles of the permanent magnet 20 of the reciprocator 21 are arranged oppositely to the magnetic poles of the permanent magnet 20 of the reciprocator 22, the reciprocating movements of the reciprocators 21 and 22 are out of phase by 180 degrees. When the reciprocators 21 and 22 are urged to move in the outward direction under the influence of the current flowing through the coil 11 of the stator 1, the springs 28, 28 are compressed.

It is preferable to vibrate the vibration system in synchronization with a characteristic (resonant) frequency of the vibration system, i.e., to put the vibration system in resonant condition with the dual goals of stable vibration and reduction in vibration energy. In order to achieve these dual goals, the linear vibration motor of the present invention is provided with a detection system which detects a characteristic of the vibration system indicative of the resonant frequency thereof under current load conditions, and a control system which is responsive to feedback signals generated by the detection system to control the magnitude and direction of the current flowing through the coil 11 in such a manner as to maintain resonant operation of the vibration system.

With reference to FIG. 7, the detection system includes a sensing magnet 29 mounted on the reciprocator assembly 2, the sensing magnet 29 having magnetic poles arranged in the direction of reciprocating movement of the reciprocators, and a sensor 39 comprised of sensing windings, and supported in an opening 34 of the frame 3. The control system includes a control output section 5 that controls the magnitude and direction of the current flowing through the coil 11 in accordance with a current (voltage) induced in the sensor 39 when the reciprocator assembly 2 is in vibration.

Figure 6:
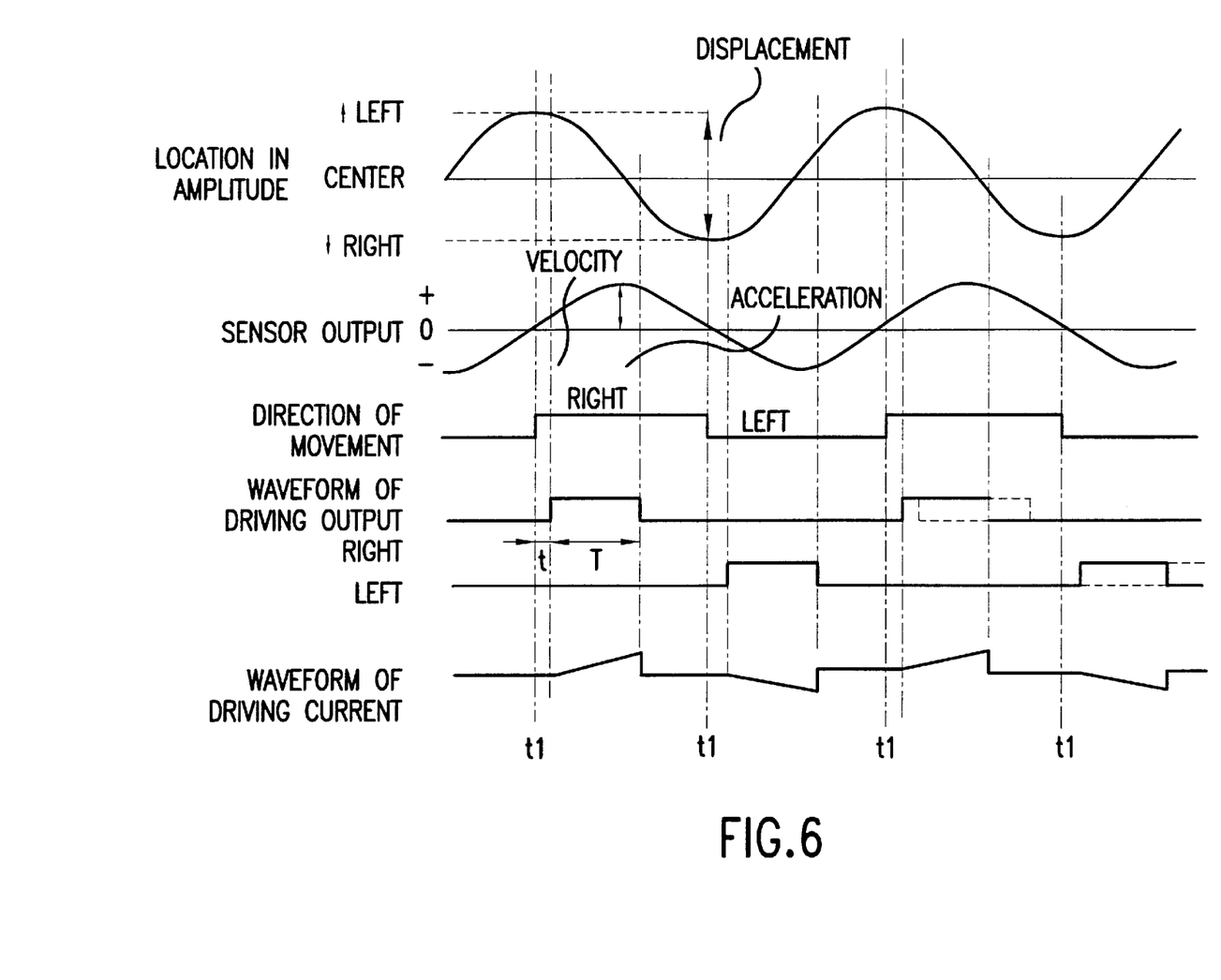
FIG. 6 is a timing diagram which illustrates the waveforms and timing relationship of various operational characteristics of and signals produced by the linear vibration motor during operation thereof.

More particularly, as is illustrated in FIG. 6, a current induced in the sensor 39 varies in accordance with the amplitude of the reciprocating vibration, the location of the reciprocator assembly 2, and/or the velocity and direction of the movement of the reciprocator assembly 2. (The terminology amplitude of the reciprocating vibration as used herein is intended to mean the magnitude of the range of reciprocating movement of the reciprocator assembly 2.) For example, when the reciprocator assembly 2 reaches a first limit of its range of reciprocating movement, the magnet 29 stops (due to zero velocity of the attached reciprocator assembly 2), and accordingly, the magnetic flux produced thereby is not changed. Thus, at this time, the voltage output of the sensor 39 is zero. When the reciprocator assembly 2 reaches a midpoint of its range of reciprocating movement, the reciprocator assembly 2 is moving at its maximum velocity, and thus, at this time, the voltage output of the sensor 39 is at its maximum. Accordingly, the maximum velocity of the reciprocator assembly 2 can be detected by detecting the maximum voltage output by the sensor 39, and the time at which the reciprocator assembly 2 reaches a dead point (i.e., a limit of its range of reciprocating movement) can be detected by detecting the zero output of the sensor 39. In addition, the direction in which the reciprocator assembly 2 moves can be detected based on the polarity of the output of the sensor 39.

Figure 11:
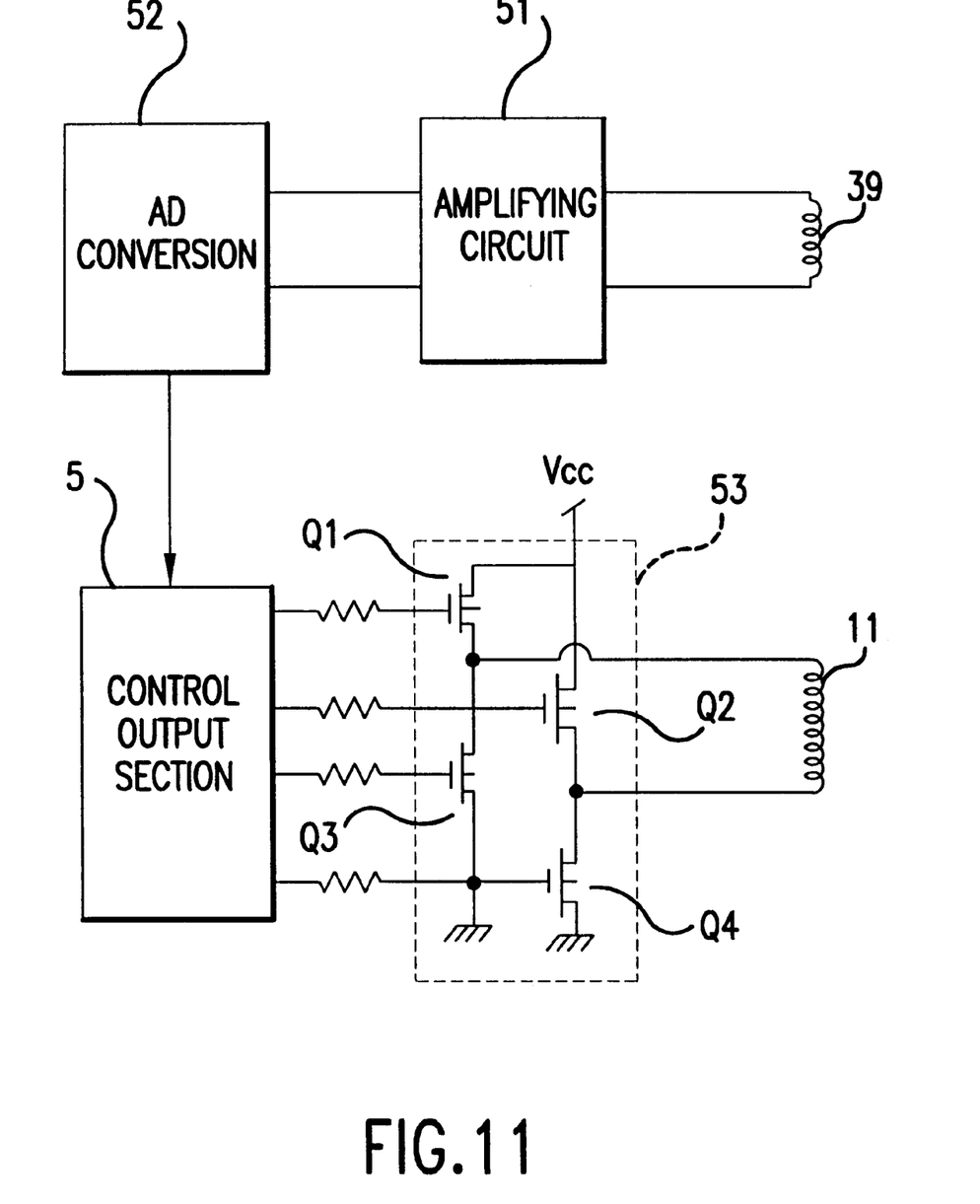
FIG. 11 is a partial block, partial circuit schematic diagram of the linear vibration motor of the preferred embodiment of the present invention.

An exemplary implementation of the detection system and control system employed in the preferred embodiment of the present invention is illustrated in FIG. 11. As can be seen, the detection system includes the sensor 39, an amplifying circuit 51, and an A/D conversion circuit 52. In operation, the output voltage transmitted by the sensor 39 (which has a sinusoidal waveform, as can be seen in FIG. 6) is amplified by the amplifying circuit 51. The amplified output voltage produced by the amplifying circuit 51 is then converted into a digital value by the A/D conversion circuit 52. The maximum velocity of the reciprocator assembly 2 can be detected by detecting the voltage level of the sensor output a prescribed period of time (t) after the time when the sensor output is zero, or by detecting a maximum voltage level of the sensor output between successive zero outputs. The time at which the direction of movement of the reciprocator assembly 2 reverses can also be detected by detecting when the sensor output is zero. In addition, since current flows through the coil 11 in opposite directions depending upon the direction of movement of the reciprocator assembly 2, it is possible to detect the direction of movement (i.e., positive or negative stroke) of the reciprocator assembly by detecting the polarity of the output voltage of the sensor 39.

The control system includes the control output section 5 and driver section 53 coupled to the coil 11. In operation, the control output section 5 receives the digital output of the A/D conversion circuit 52, which constitutes a feedback signal indicative of at least one of the displacement, acceleration, and velocity of the reciprocator assembly 2. The control Output section 5 and driver 53 then adjusts the magnitude and/or direction of the driving current flowing through the coil 11 in accordance with the value of the feedback signal, to thereby maintain operation of the vibration system of the linear vibration motor at the resonant frequency, i.e., to maintain the resonant condition of the vibration system.

Figure 8:
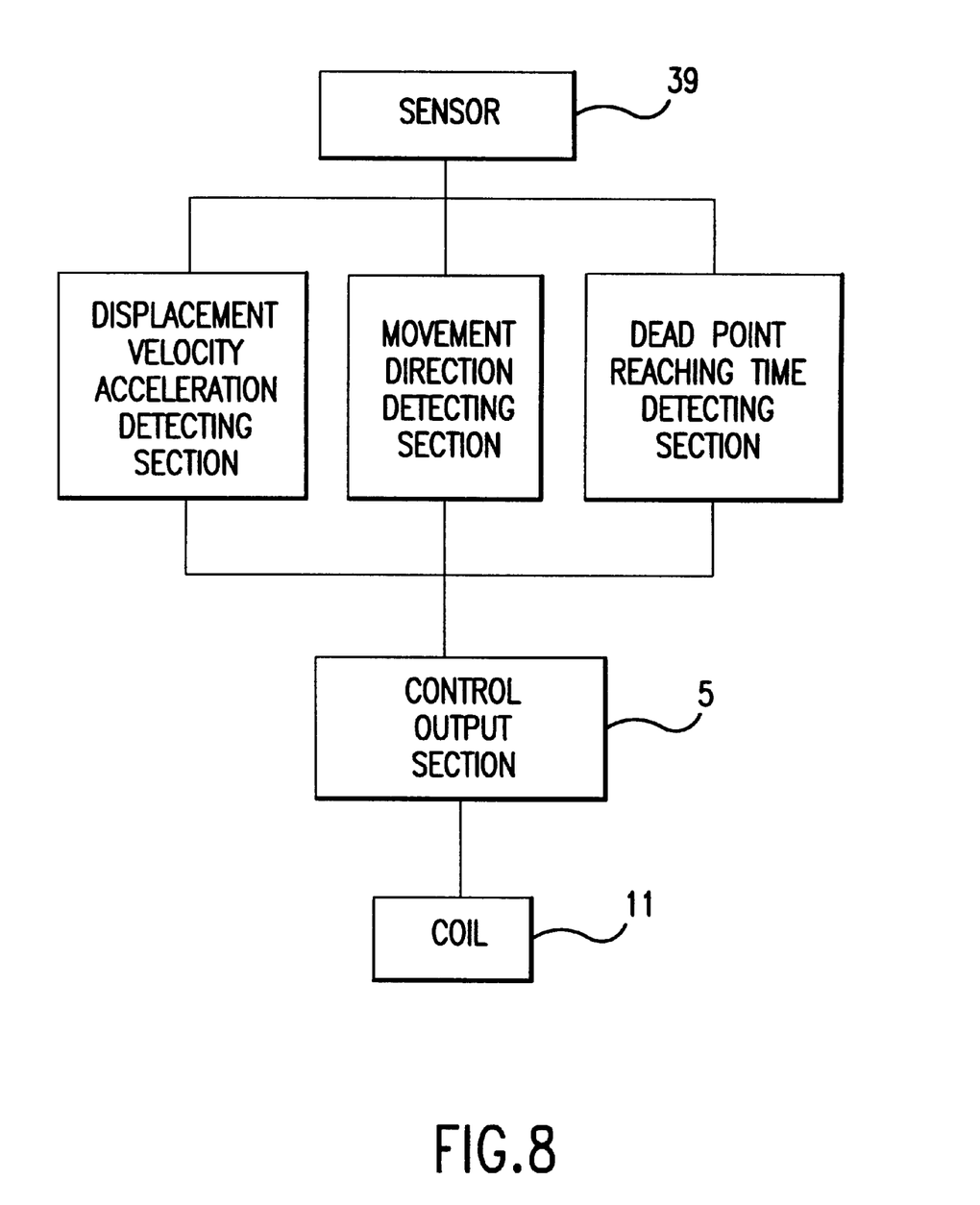
FIG. 8 is a block diagram of the detection and control systems of the linear vibration motor of the linear vibration motor of the preferred embodiment of the present invention.

For example, if the detection system detects a reduction in the amplitude of the reciprocating vibration (i.e., a reduction in the range of reciprocating movement of the reciprocator assembly 2), e.g., due to an increased load, the control output section 5 will, in response to the feedback signal from the detection system, increase the driving current (e.g., by increasing a period of time T during which the current is supplied and/or by increasing the maximum current) by an amount sufficient to increase the velocity of the reciprocator assembly 2 in such a manner as to maintain a substantially constant amplitude of the reciprocating vibration. In an exemplary embodiment, the detection system detects the velocity of the reciprocator assembly 2 and produces a digital feedback signal indicative thereof. The control output section 5 includes a memory (e.g., a ROM) which stores a different PWM value for each detected velocity value. In operation, the control output section 5 reads the PWM value from its memory that corresponds to the detected velocity value, and then controls the pulse width of the driving current supplied to the coil 11 in accordance with the read-out PWM value. Since velocity is correlated with displacement and acceleration, displacement or acceleration may be detected in place of velocity, as is diagrammatically illustrated in FIG. 8. The driver 53 includes four FET switching devices Q1–Q4. By turning on either the switching devices Q1 and Q3 or the switching devices Q2 and Q4, the direction of the current flowing through the coil 11 can be switched, to thereby facilitate reciprocating movement of the reciprocator assembly 2.

The control output section 5 only permits the driving current to flow in a direction determined in accordance with the detected direction in which the reciprocator assembly 2 moves, in order to thereby prevent the driving current from braking the reciprocator assembly 2. In addition, the control output section 5 minimizes any required increases of the driving current by utilizing the biasing movement of the spring system, specifically, by allowing the driving current to flow when a prescribed period of time t has passed after the time $t_1$ at which the direction of movement of the reciprocator assembly 2 reverses. If the driving current were allowed to flow through the coil 11 in a reverse direction before the time $t_1$, the vibration of the reciprocator assembly 2 would be braked. If the driving current were allowed to flow through the coil 11 in the direction of movement of the reciprocator assembly 2 after the reciprocator assembly 2 has passed the midpoint of its range of reciprocating movement, it would be impossible to realize a multiplied force of the driving (electromagnetic) force exerted by the coil 11 and the driving (repulsion) force exerted by the spring system, since the driving force caused by the repulsion force of the spring system compressed by the reciprocator assembly 2 will have already diminished. Hence, the time at which the driving current starts to be applied to the coil 11 is prescribed to be in a range between the time at the direction of movement of the reciprocator assembly 2 is reversed and the time at which the reciprocator assembly 2 reaches the midpoint of its range of reciprocating movement. The time at which the reciprocator assembly 2 reaches the midpoint of its range of reciprocating movement can be easily detected as it corresponds to the time at which the sensor 39 transmits its maximum output. The time t may be dynamically adjusted in accordance with the detected velocity or acceleration of the reciprocator assembly 2.

With the above-described drive control system, it is not necessary to detect the direction of movement of the reciprocator assembly 2 since the direction of movement of the reciprocator assembly 2 is related in a known manner to the polarity of the applied driving current, thereby making it possible to simply successively switch the direction in which the driving current flows through the coil 11, e.g., by appropriately controlling the switching action of the driver 53. Further, with the above-described drive control system, it is not necessary to detect the time at which the direction of movement of the reciprocator assembly 2 is reversed, since the frequency at which the direction of current flow through the coil 11 is switched by the driver 53 is synchronized with the characteristic or resonant frequency of the vibration system, thereby making it possible to simply apply the driving current in each direction for a prescribed time interval which can be dynamically adjusted in accordance with the detected resonant frequency of the vibration system. With this technique, the driving current can be applied to flow through the coil 11 in the appropriate direction, even if the reciprocator assembly 2 is so heavily loaded as to be temporarily stopped, and the driving current can be applied to flow through the coil 11, even if there is dispersion in the characteristic frequency of the vibration system, e.g., due to a difference between the masses of the reciprocators 21, 22, or between the spring constants of the compression coil springs 28, 28. Thus, it can be ensured that the vibration system converges to the instantaneous characteristic frequency of the vibration system and that the vibration system is vibrated at a substantially constant amplitude of reciprocating vibration.

As previously discussed, the velocity of the reciprocator assembly 2 can be detected on the basis of either the maximum voltage value output by the sensor 39 or on the basis of the time interval between successive times at which the output of the sensor 39 is zero. The latter approach ensures detection of the time at which the direction of movement of the reciprocator assembly 2 reverses without being influenced by any dispersion or variation in the magnetic force of the magnet 29, and any dispersion or variation in the gap between the magnet 29 and the sensor 39. Accordingly, the velocity of the reciprocator assembly 2 can be detected more reliably and precisely on the basis of the time interval between successive times at which the output of the sensor 39 is zero.

As an alternative to the detection system which includes the magnet 29 and the sensor 39, it is possible to use a detection system which includes a slit plate 60 attached to the reciprocator assembly 2 (see FIGS. 9 and 10) and a photosensor (not shown) aligned with the slit in the slit plate 60, whereby the output of the photosensor would vary in dependence on the displacement, acceleration, and/or velocity of the reciprocator assembly 2. In general, a non-contact type detection system is preferred in order not to prevent vibration of the reciprocator assembly 2.

With the above-described linear vibration motor and control system therefor, if the detection system is rendered incapable of performing its detection function due to the amplitude of the reciprocating vibration of the vibration system falling below a minimum (threshold) level (e.g., when the motor is heavily loaded), the control system supplies the necessary driving current to the coil 11 because the control system no longer receives the feedback signal from the detection system which is necessary for its operation (i.e., the servo feedback loop is opened or interrupted). The present invention is designed to overcome this shortcoming.

Figure 1:
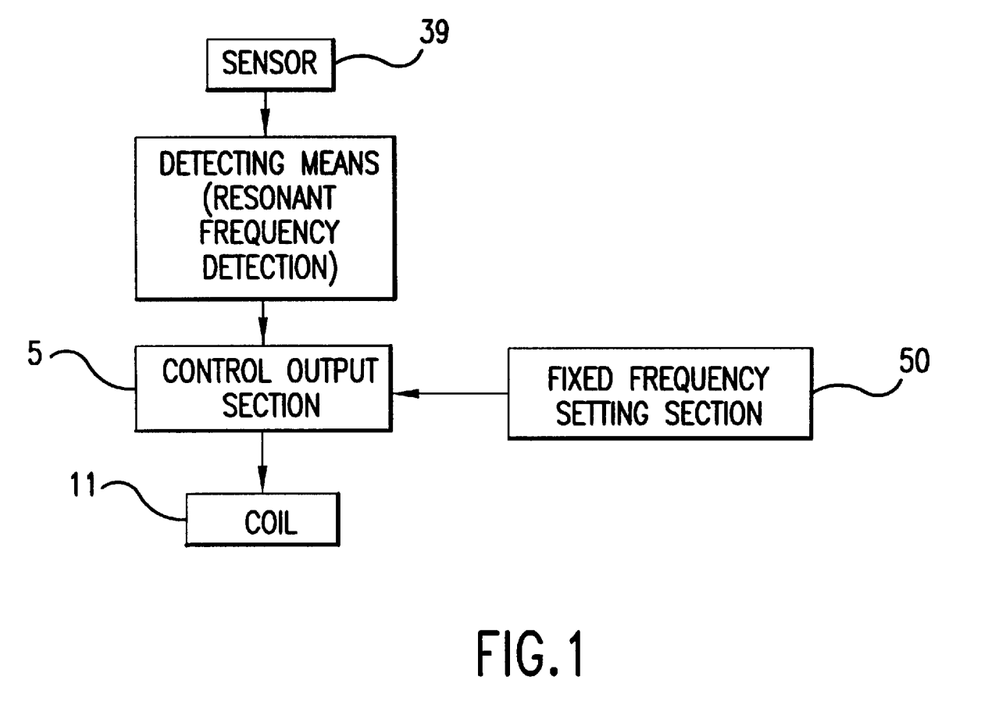
FIG. 1 is a block diagram of an exemplary embodiment of the linear vibration motor of the present invention.

More particularly, the linear vibration motor of the present invention includes a fixed frequency setting section 50, as depicted in FIG. 1, which stores one (or a plurality of) fixed frequency values which is (are) utilized by the control system when it is determined that a condition exists (e.g., the amplitude of the reciprocating vibration of the vibration system falling below the minimum threshold level) which renders the detection system temporarily incapable of performing its detection function (i.e., non-functional). Specifically, when it is determined that the detection system is temporarily nonfunctional, the control output section 5 reads a fixed frequency value from the fixed frequency setting section 50, and then switches the driver 53 at that fixed frequency until the operation of the detection system is restored. In this manner, the direction in which the current flows through the coil 11 is switched by the control system at the fixed frequency during times when the detection system is non-functional.

Figure 2:
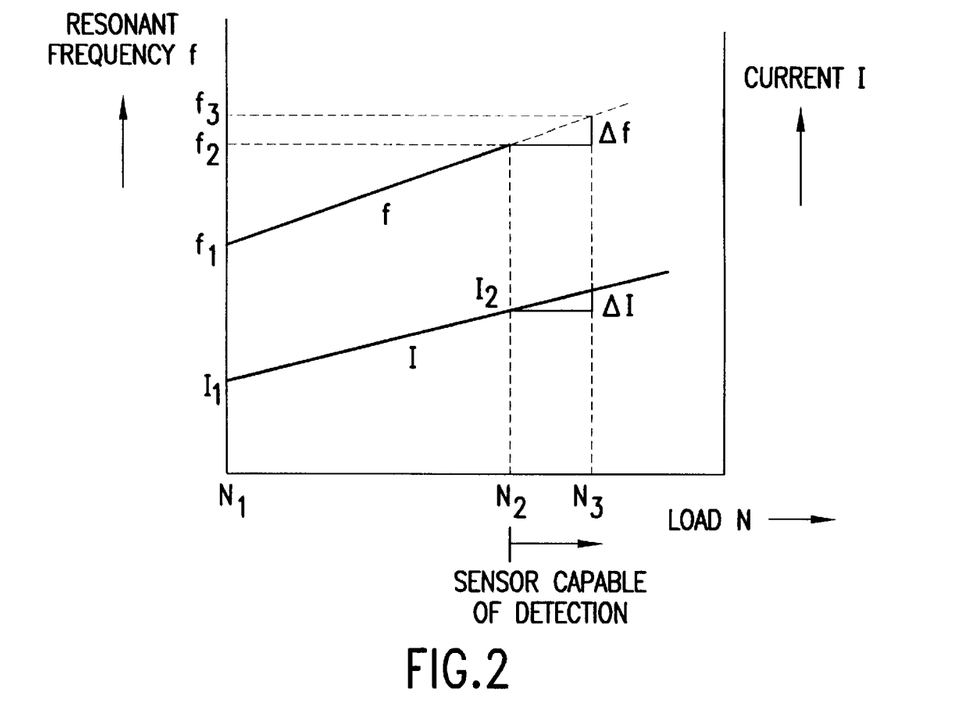
FIG. 2 is a diagram which illustrates the relationship of resonant frequency, current, and load, in the operation of the linear vibration motor of the present invention.
Figure 3:
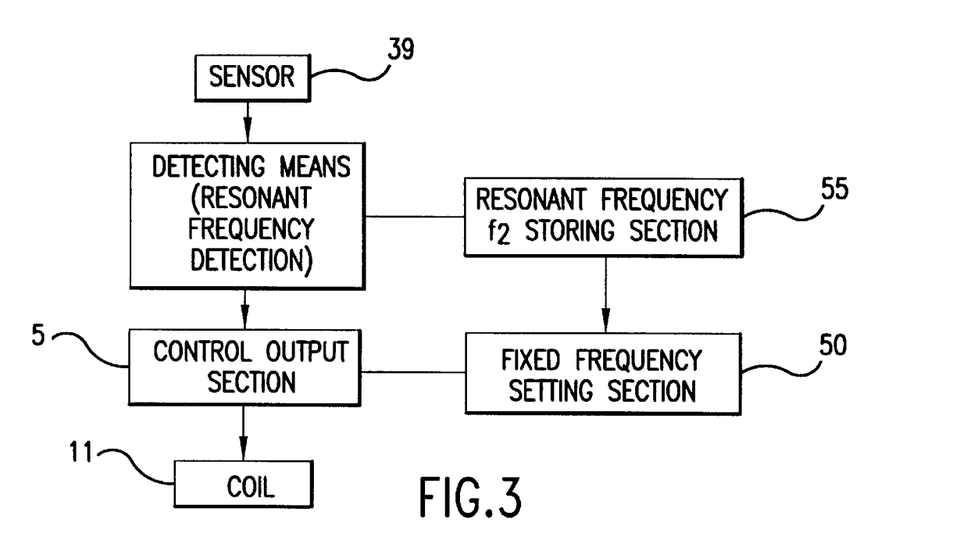
FIG. 3 is a block diagram of another exemplary embodiment of the linear vibration motor of the present invention.

As is depicted in FIG. 2, when a load N on the linear vibration motor increases from $N_1$ to $N_2$, the resonant frequency of the vibration system changes from $f_1$ to $f_2$. If it is assumed that the detection system is rendered non-functional when the load N exceeds $N_2$, any one or more frequencies between $f_1$ and $f_2$ may be advantageously employed as the fixed frequency(ies) stored in the fixed frequency setting section 50. It is most preferable to use the frequency $f_2$, since the frequency $f_2$ has a range of variance due to differences between the masses of the reciprocators 21, 22 or differences between the spring constants of the compression coil springs 28, 28. More particularly, as is depicted in FIG. 3, the linear vibration motor of the present invention most preferably includes a resonant frequency ($f_2$) storing section 55 which stores the resonant frequency ($f_2$) which is detected by the detection system immediately before detection of the condition which causes the detection system to be rendered temporarily non-functional (e.g., the value of N exceeding ($N_2$). The resonant frequency $f_2$ stored by the resonant frequency storing section 55 can then be supplied to the fixed frequency setting section 50 for storage therein and subsequent use by the control system.

Figure 4:
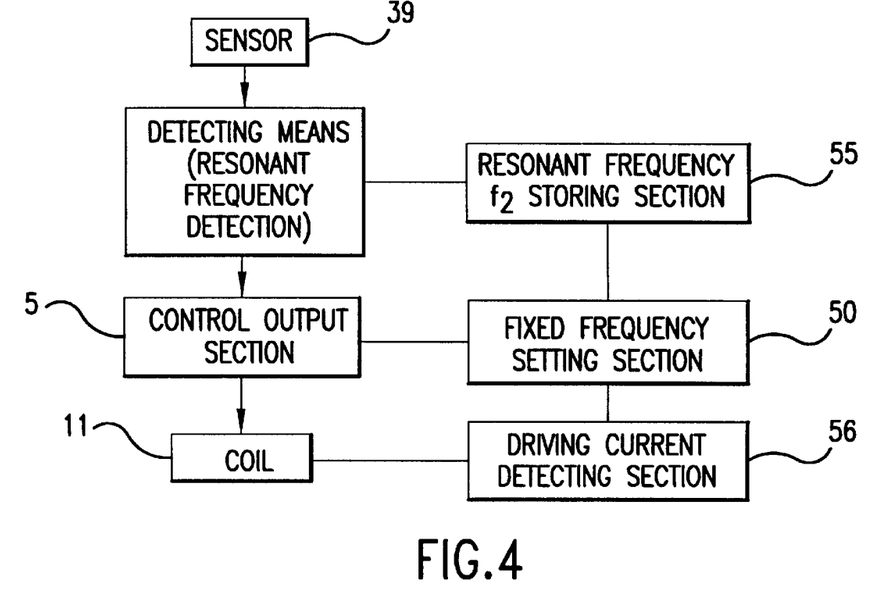
FIG. 4 is a block diagram of another exemplary embodiment of the linear vibration motor of the present invention.

With additional reference to FIG. 2, when the load N is increased to $N_3 > N_2$, the driving current I is increased by $\Delta I$. Hence, a frequency variation $\Delta f$ in dependence on the current variation $\Delta I$ may be predicted, and the fixed frequency $f_2$ may be adjusted in accordance with the predicted frequency variation to thereby produce a frequency $f_3$ ($=f_2 + \Delta f$) for driving the coil 11. FIG. 4 is a block diagram of another exemplary embodiment of the linear motor of the present invention that incorporates a driving current detecting section 56 which performs this operation and supplies the predicted current and/or frequency variations to the fixed frequency setting section 55 for use thereby in adjusting the fixed frequency $f_2$.

Figure 5:
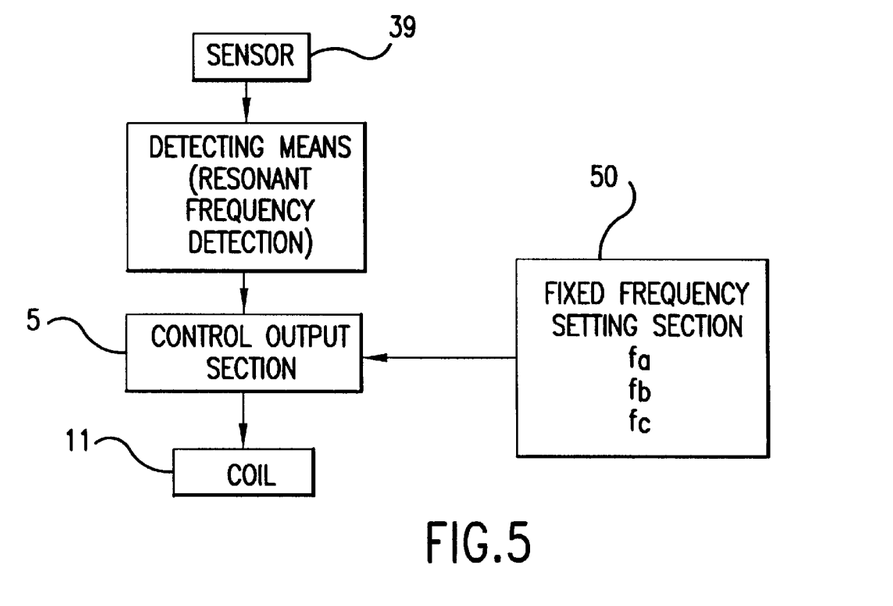
FIG. 5 is a block diagram of another exemplary embodiment of the linear vibration motor of the present invention.

Another exemplary embodiment of the linear vibration motor of the present invention is depicted in FIG. 5, wherein it can be seen that the fixed frequency setting section 50 is designed to store a plurality of prescribed frequencies $f_a$, $f_b$ and $f_c$. With this embodiment, the control output section 5 can successively read out the different frequency values $f_a$, $f_b$, and $f_c$, and then successively drive the coil 11 at these frequencies during times when the detection system is non-functional. For instance, with additional reference to FIG. 2, the frequencies $f_a$, $f_b$ and $f_c$ may be set equal to $f_1$, $f_2$ and $f_3$, respectively.

The detection system is also non-functional during start-up of the linear vibration motor. Accordingly, the control system can drive the coil 11 at the prescribed frequency(ies) stored in the fixed frequency setting section 50 during start-up of the linear vibration motor. Otherwise stated, the start-up mode of the motor is also a condition of the motor which can be detected to switch the control system into the back-up mode of operation.

Because the spring system is driven even when the detection system is non-functional, it is possible to rapidly return the spring system back to resonant condition after the detection system becomes functional again. It is believed that using the resonant frequency $f_2$ as the prescribed back-up frequency for switching the driving current applied to the coil 11 enables the spring system to be most rapidly returned to resonant condition (i.e., a condition in which the frequency at which the direction of the driving current is switched is synchronized with the characteristic (resonant) frequency of the vibration system), particularly when this value is adjusted in accordance with predicted variations in the driving current based on predicted variations in the resonant frequency, e.g., due to variations in load.

Although various embodiments of the present invention have been described in detail hereinabove, it should be clearly understood that many variations and/or modifications of the basic inventive concepts taught herein that may appear to those reasonably skilled in the art will still fall within the spirit and scope of the present invention as defined in the appended claims.

What is claimed is:

1. A method of controlling a linear vibration motor which includes a stator comprised of an electromagnet or permanent magnet, a reciprocator comprised of a permanent magnet or electromagnet and supported with a spring; a detection system which detects at least one of displacement, velocity and acceleration of the reciprocator; and a control system which controls a driving current supplied to a coil of the electromagnet in accordance with a feedback output of the detection system to thereby drive a vibration system including the reciprocator and the spring in resonance with a characteristic frequency of the vibration system, the method including the steps of:

determining when a condition exists which prevents the detection system from detecting at least one of displacement, velocity and acceleration of the reciprocator; and using the control system to drive the vibration system at a prescribed frequency when it is determined that the condition exists.

2. The method of controlling a linear vibration motor as set forth in claim 1, further including the steps of:

determining and storing an instantaneous value of said characteristic frequency, and setting said prescribed frequency to a last instantaneous value of the characteristic frequency when it is determined that the condition exists.

3. The method of controlling a linear vibration motor as set forth in claim 1, further including the step of varying the prescribed frequency in accordance with variations in the driving current.

4. The method of controlling a linear vibration motor as set forth in claim 1, further including the step of driving the vibration system at the prescribed frequency during start-up of the vibration system.

5. The method of controlling a linear vibration motor as set forth in claim 1, wherein the prescribed frequency is varied by successively using a plurality of different predetermined fixed frequencies.

6. A linear vibration motor, including:

a vibration system that includes a driven member which is mounted to a magnetic member for reciprocating movement, wherein an amplitude of the reciprocating movement varies as an inverse function of load on the motor;

an electromagnetic driver that includes a coil and which drives the vibration system by applying an electromagnetic force to the magnetic member, the electromagnetic force being produced by a driving current flowing through the coil;

a detection system which detects at least one characteristic of the vibration system that is related to a characteristic frequency of the vibration system, and which produces a feedback signal indicative of a value of the at least one characteristic; and a control system which is responsive to the feedback signal, during a primary mode of operation, to controllably vary the driving current flowing through the coil in such a manner as to drive the vibration system in resonance with the characteristic frequency, and which determines the existence of a condition that renders the detection system non-functional, and drives the vibration system at a prescribed frequency when it is determined that the condition exists, during a back-up mode of operation.

7. The linear vibration motor as set forth in claim 6, wherein the at least one characteristic of the vibration system comprises at least one of displacement, velocity, and acceleration of the driven member.

8. The linear vibration motor as set forth in claim 6, wherein the condition comprises a start-up mode of the motor.

9. The linear vibration motor as set forth in claim 6, wherein the condition comprises the load on the motor exceeding a prescribed maximum threshold level.

10. The linear vibration motor as set forth in claim 6, wherein the condition comprises the amplitude of the reciprocating movement falling below a prescribed minimum threshold level.

11. The linear vibration motor as set forth in claim 6, wherein the driven member comprises a reciprocator.

12. The linear vibration motor as set forth in claim 6, wherein the control system is responsive to the feedback signal to controllably vary the driving current flowing through the coil in such a manner as to maintain a substantially constant value of the amplitude of the reciprocating movement.

13. The linear vibration motor as set forth in claim 6, wherein the vibration system further includes a spring system which supports the driven member.

14. The linear vibration motor as set forth in claim 6, wherein the control system includes means for pulse-width modulating the driving current in response to the feedback signal.

15. The linear vibration motor as set forth in claim 6, wherein the control system includes a frequency setting section which stores the prescribed frequency.

16. The linear vibration motor as set forth in claim 6, wherein the control system includes a frequency governing section which includes:

a first portion which determines the instantaneous value of the characteristic frequency; and, a second portion which determines and stores the last instantaneous value of the characteristic frequency before the existence of the condition that renders the detection system non-functional is determined, wherein the last instantaneous value constitutes the prescribed frequency.

17. The linear vibration motor as set forth in claim 6, wherein the control system includes:

a first portion which stores a plurality of different frequencies; and a second portion which successively produces the different frequencies at prescribed time intervals, wherein each of the different frequencies constitutes the prescribed frequency at the time it is produced.

18. The linear vibration motor as set forth in claim 6, wherein the control system varies the prescribed frequency in accordance with variations in the driving current.

19. The linear vibration motor as set forth in claim 6, wherein the electromagnetic driver includes a stator comprised of an electromagnet having the coil wound therearound.

20. A linear vibration motor, including:

a vibration system that includes a driven member which is mounted to a magnetic member for reciprocating movement, wherein an amplitude of the reciprocating movement varies as an inverse function of load on the motor;

electromagnetic driver means for driving the vibration system by applying an electromagnetic force to the magnetic member, the electromagnetic driver means including a coil and the electromagnetic force being produced by a driving current flowing through the coil;

detection means for detecting at least one characteristic of the vibration system that is related to a characteristic frequency of the vibration system, and which produces a feedback signal indicative of a value of the at least one characteristic; and, control means responsive to the feedback signal, during a primary mode of operation, for controllably varying the driving current flowing through the coil in such a manner as to drive the vibration system in resonance with the characteristic frequency, and for determining the existence of a condition that renders the detection system non-functional, and driving the vibration system at a prescribed frequency when it is determined that the condition exists, during a back-up mode of operation.

* * * * *